March 6, 1928. 1,661,348
F. W. GRUNDMAN
THERMOSTATIC CONTROL DEVICE
Filed April 4, 1923 2 Sheets-Sheet 1
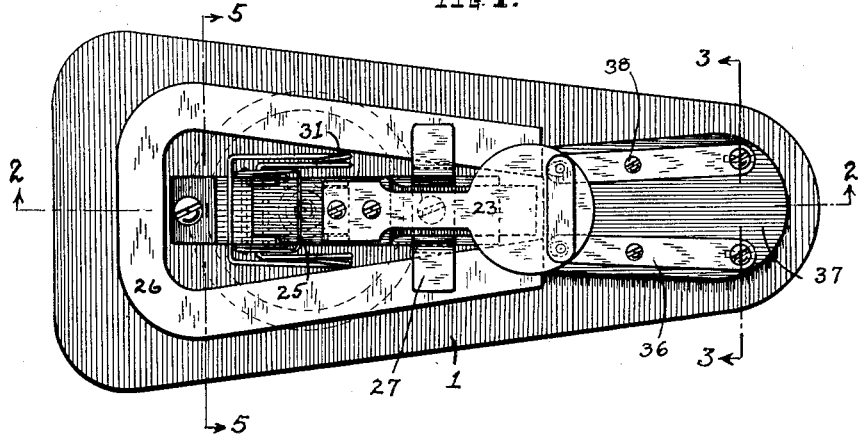
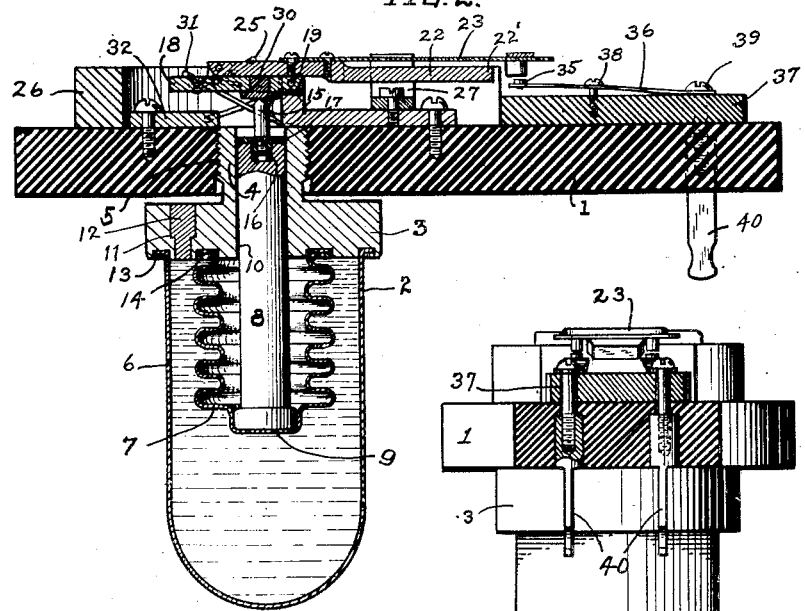
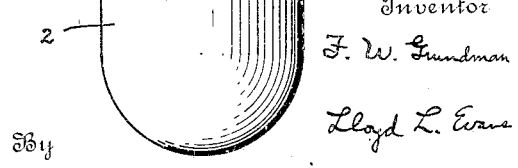
Inventor
F. W. Grundman
Lloyd L. Evans
By
Attorney March 6, 1928.
F. W. GRUNDMAN
THERMOSTATIC CONTROL DEVICE
1,661,348
Filed April 4, 1923     2 Sheets-Sheet 2
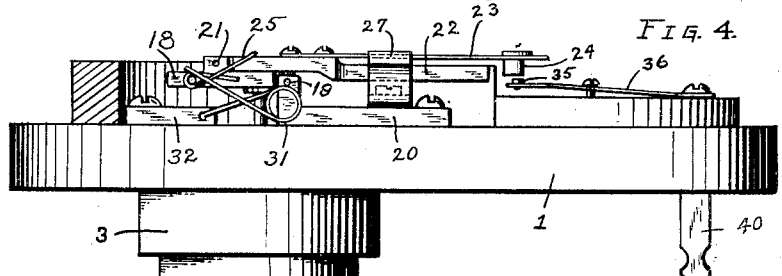
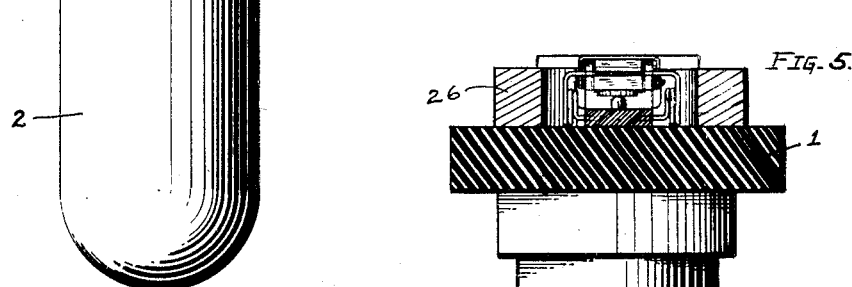
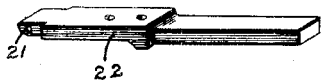
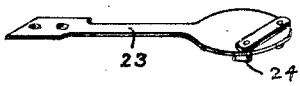
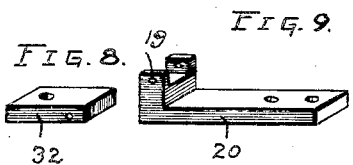
Inventor
F. W. Grundman
Lloyd L. Evans
By
Attorney Patented Mar. 6, 1928.

1,661,348

UNITED STATES PATENT OFFICE.

FRED W. GRUNDMAN, OF CLEVELAND, OHIO, ASSIGNOR TO THE BRUSH LABORATORIES COMPANY, OF CLEVELAND, OHIO, A CORPORATION OF OHIO.

THERMOSTATIC CONTROL DEVICE.

Application filed April 4, 1923. Serial No. 629,820.

This invention relates to improvements in electric circuit making and breaking mechanism and more particularly to such mechanism controlled by thermostatic means.

An object of the invention is to so construct a thermostatic controlling device dependent for its operation upon the expansion and contraction, due to temperature changes, of an enclosed liquid, so that a relatively large force is available for actuating the circuit opening and closing means.

A further object of the invention is to provide a thermostatic device in which the thermostatic element may be adjusted relative to the circuit opening and closing means so that the device may be made to operate at various temperatures.

Another object of the invention is to provide a construction which though designed for refrigeration purposes can be subjected to much higher temperatures, as when shipping, and which will automatically take care of the abnormal movement of the thermostatically actuated member at such higher temperatures without losing any of the effectiveness or sensitivity of the device when it is to be used at the refrigerating temperature.

Still another object of the invention is to provide a circuit opening and closing mechanism in which the means moved by the changes of volume of the liquid of the thermostatic device is always in contact with the lever for opening and closing the circuit, automatically taking up any wear between them, and does not have such a mechanical connection therewith that play or lost motion can develop between the parts due to wear.

Devices using gas or vapor as a working medium depend for operation on a change in pressure with changing temperature, which ordinarily is balanced against a spring, the calibration thus depending on the tension of the spring. This arrangement is generally unreliable. Also, the frictional forces involved in any mechanism connected to a thermostat of the vapor pressure type cause further errors, as when the temperature is rising the frictional resistance is acting with the restraining spring and thus causes the mechanism to operate at a considerably higher temperature than when the temperature is falling and the friction is opposed to the restraining spring.

It is generally understood that liquids as compared to gases or vapors are virtually incompressible. Therefore, by using a liquid for an actuating medium and depending on volume rather than pressure changes for operation, spring action and friction take no part in the calibration, since the forces developed by the expanding liquid are ample to overcome such friction as may exist in the operated mechanism. Since these forces are so large, the motion of the plunger or rod carried by the movable part of the enclosing chamber is substantially independent of the forces opposed to it. Consequently if the motion be small it may be greatly magnified by levers or other suitable means. Also, as long as the liquid enclosing chamber remains completely filled with liquid and tightly sealed, the position of the movable plunger relative to the circuit opening and closing mechanism will always be the same for a given temperature, so that the device will retain its calibration.

A further advantage is that in devices operating on vapor pressure, there must be a change between the liquid and vapor state of some of the working substance, and accordingly the latent heat must be conducted through the walls of the container, thus causing the operation to lag somewhat.

In the drawings,

Figure 1 is a plan view of a construction embodying my invention.

Fig. 2 is a sectional view on line 2—2, Fig. 1.

Fig. 3 is a section on line 3—3, Fig. 1.

Fig. 4 is a side elevation of the device with part of the magnet removed to show more clearly the spring and lever mechanism.

Fig. 5 is a section on line 5—5, Fig. 1.

Figs. 6–9 inclusive are perspective views of the levers and spring holding members.

Fig. 10 is a perspective view of the armature.

Fig. 11 is a perspective view of the means for securing the magnet to the base.

In the embodiment of my invention I have shown a suitable support 1 which may be a base plate of insulating material adjustably secured to which is a thermostatic cartridge 2. The cartridge 2 comprises a disk of metal 3 having a hollow threaded boss 4 to engage a threaded recess 5 in the insulating block and metal cups 6 and 7 are secured to annular grooves 13 and 14 in the disk 3 by any suitable means such as soldering, brazing, or the like, to obtain a fluid-tight joint. The inner cup-shaped member 7 is a metal bellows and contains a plunger 8 secured to the bellows at a point 9 in any suitable manner for movement therewith. The upper portion of the plunger projects through the aperture 10 of the disk 3 to actuate the circuit opening and closing mechanism hereafter described. The space between the bellows 8 and cup 6 is entirely filled with a suitable operating liquid through aperture 11, the aperture then being closed by a plug 12 which may be threaded or tapered or otherwise secured to produce a fluid-tight joint.

The operating liquid must be one which expands with rise of temperature, and which does not boil or freeze at any temperature to which the device may be subjected. For thermostats to be used in refrigerators, I have found acetone to be suitable.

It is evident that a rise of temperature will cause the liquid to increase in volume, and that accordingly bellows 7, being the only flexible part of the chamber containing said liquid, must collapse, thus raising plunger 8, which cooperates with circuit closing mechanism hereinafter described. Conversely, a fall in temperature will cause the liquid to contract and plunger 8 to fall.

The plunger 8 has a hardened pin 15 suitably secured and electrically insulated from the end thereof. The pin is preferably set into a recess 16 and surrounded by a bushing 17 of electrical insulating material.

A lever arm 18 is pivoted at 19 to the member 20 secured to a base block 1. Pivoted to the lever 18 at 21 is a member 22 to which is attached a resilient member 23 carrying a suitable contact 24. The member 22 underlies the resilient member 23 for a substantial portion of its length for a purpose to be hereinafter described, but is spaced from the member 23 to permit the latter to move relative to the member 22. A spring 25 has its ends secured in a recess in the lever 18 and its central portion bearing upon the member 22 forwardly of its pivot point to hold the member 22 against the lever 18 during normal operation, so that they move together as one piece. The resilient member 23 may be of magnetic material, thus serving as an armature itself, or a suitable armature may be attached to it for engagement with a suitable magnet 26 which, if a permanent magnet be desired, may be secured to the base by the fastening member 27, the spring or armature 23 being sufficiently wide to engage the poles of the magnet. Opposing the hardened pin 15 of the plunger 8 is a hardened wear plate 30 set into the lever 18 or secured thereto in any suitable manner. Spring 31 has its ends secured to the plate 32 which is fastened to the base and has its central portion overlying the rearwardly extending portion of the lever 18, this portion extending rearwardly and beyond the member 22.

The spring 31 forces the lever 18 down, holding the hardened wear plate in firm contact with the hardened pin of the plunger at all times. This spring is preferably made relatively stiff to insure positive action between the plunger 8 and the lever 18.

The resilient member 23 may carry one or two contacts, as desired. I have shown in the drawing two such contacts 24, although a construction using one contact such as shown in the application of C. B. Sawyer, Serial No. 601,652, filed November 17, 1922, may be sometimes preferable. Disposed beneath the contacts 24 are contacts 35, mounted on springs 36 which are secured in any suitable manner as by screws 39 to portion 37 of the base. Upward movement of the springs 36 is limited by the stops 38 which are intermediate the ends of the springs. The fastening means 39 are connected to the posts 40 which may be placed in any suitable manner in an electrical circuit with a temperature changing device (not shown).

When a rise of temperature causes expansion of the liquid and consequent movement of the plunger 8, it causes lever 18 to move in one direction and the spring 23, being disposed on the opposite side of the fulcrum, in the opposite direction, thus causing the spring 23 to approach the poles of the magnet 26. When the resilient armature 23 comes within the lines of force of the magnet, the pull of the magnet will quickly pull the armature to it, causing the contacts 24 to suddenly engage contacts 35 until movement of the armature 23 is positively arrested as by engagement with the poles of the magnet.

With a fall of temperature, the member 23 is actuated in the opposite direction due to the spring 31 causing the lever 18 to follow plunger 8 when it moves oppositely due to contraction of the liquid in the enclosed chamber. When the resilient member 23 has been sufficiently flexed, it will suddenly leave the magnet, the springs 36 with the contact points 35 will follow the contacts 24 and remain in contact therewith until restrained by the stops 38, when the engagement will suddenly be broken and the circuit opened. While the stops 38 are preferable, if they are omitted, the contacts will remain together until the spring 36 attains unstressed position. It will thus be seen that the springs 36 hold the contacts firmly together and prevent destructive sparking which might otherwise occur. Furthermore, the springs 36 hold the contacts together until the member 23 has definitely left the member 26 and is moving rapidly so that the circuit is broken suddenly when further motion of spring 36 is restrained.

Should the resilient armature 23 freeze to the magnet so that flexing of it due to contraction of the liquid and consequent movement of the member 22 in a direction away from the magnet not be sufficient to cause the armature to leave the magnet by the time the end 22' of the member 22 engages the armature 23, said end 22' will positively raise the armature from the poles of the magnet, thus insuring the opening of the circuit as above described. It is also obvious that this same movement will separate the contacts in case they should stick together by reason of an unduly large electric current through them or for any other cause.

As the device herein shown is designed for refrigeration purposes, it is obvious that prior to installation the device will be subject to much higher temperatures than those for which it is intended to be used. Consequently, it is necessary to provide a device to take care of the extraordinary expansion of the liquid and movement of the plunger 8 when the device is subject to such relatively higher temperatures above the normal operating ranger, as when the device is being shipped.

After the plunger 8 has moved sufficiently in response to expansion of the liquid to cause the armature 23 to contact with the poles of the magnet, thus placing the contacts 24 and 35 together, continued movement of the plunger 8 only causes movement of the member 22 on the pivot 21 relative to the lever 18, the armature 23 sliding at the same time along the magnet and the elongated contacts 24 slidably moving on the contacts 35. The spring 25 will return the member 22 back to normal operative position in engagement with the lever 18 when the temperature has fallen sufficiently to retract the plunger 8, the armature 23 and the contacts 24 sliding in the opposite direction to normal operative position, and, if the plunger is further retracted, the armature 23 will be flexed and engagement between the contacts 24 and 35 will be broken, as described above.

By screwing the cartridge 2 into or out of the base member 1 it is obvious that the plunger 8 will have to be moved to a further extent or to a less extent respectively to operate the circuit opening and closing mechanism. It will thus be seen that the cartridge 2 can be so set that it will close the circuit at any desired temperature and this temperature may be changed from time to time if desired merely by altering the position of the cartridge with respect to the make and break mechanism.

It will also be seen that the circuit opening and closing mechanism may be utilized with either a double or single contact construction as the operation of the thermostatic means and the circuit opening and closing means is equally applicable to a device having a single pair of contacts.

It will also be noticed that the cup-shaped member 6 may be extended to any suitable length, or a tube may be connected therewith carrying a bulb to be placed within the chamber, the temperature of which is to be controlled, if it be desired not to have the circuit opening and closing means in the chamber.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In mechanism of the character described, the combination with a support, of circuit opening and closing mechanism carried by said support, comprising a pivoted lever, means connected to the lever for movement therewith during normal operation of the device, said means carrying a contact engageable with a cooperable contact to close the electrical circuit, a temperature control device comprising an enclosed chamber completely filled with liquid not saturated with gases in solution within the operating range, said chamber having an expansible portion movable in response to changes in the volume of said liquid, a plunger carried by said expansible portion to cause said lever to move to circuit closing position, said means movable with the lever being connected thereto to permit relative movement with respect to said lever when the lever is further moved beyond a predetermined operating position after the contacts are engaged.

2. In mechanism of the character described the combination with a temperature controlling mechanism of a member movable thereby in response to changes of temperature, a pivoted lever actuated by said movable member, means in connection with said first named lever having a contact engageable with a cooperable contact to close the electrical circuit, means for causing said first named means to move with said first named lever during normal operation, said first named means being connected to said lever to permit relatively large motion of said first named lever without injury to the device.

3. In mechanism of the character described the combination with a temperature controlling mechanism of a member movable thereby in response to changes of temperature, a pivoted lever actuated by said movable member, means connected to said lever for movement therewith during normal operation of the device, said means carrying a contact engageable with a cooperable contact to close the electrical circuit, said means being connected to the lever to permit relative movement with respect to said lever when the lever is further moved after the contacts are engaged.

4. In mechanism of the character described the combination with a temperature controlling mechanism of a member movable thereby in response to changes of temperature, a pivoted lever actuated by said movable member, a member pivoted to said lever and including an armature, a magnet, means for causing said pivoted member to remain in contact with said lever during normal operation of the device, said armature carrying a contact engageable with a cooperable contact to close the electrical circuit, said member and lever being connected to permit further movement of the lever by the temperature controlling mechanism after the contacts are engaged.

5. In mechanism of the class described, a support, a circuit opening and closing mechanism carried thereby, including a movable armature carrying a contact member to open and close said circuit, an opposing contact, a magnet coacting with said armature, an enclosed chamber completely filled with liquid not saturated with gases in solution within the operating range, said chamber having an expansible portion movable in response to changes in the volume of said liquid, an actuator carried by said expansible portion, and means connecting said actuator with said armature to permit relative movement between the armature and the actuator after the contacts are in engagement and adapted to cause said armature to move with said actuating means before the contacts are in engagement.

6. A thermostat control device comprising a controlling means for heat transfer apparatus, a lever arm adapted to control said means, a temperature responsive actuator adapted to control the movement of said lever arm, and means interposed between said actuator and said lever arm adapted to cause said lever arm to follow the movements of said actuator within a predetermined operating zone and to permit relative movement between the actuator and the lever arm when said actuator moves beyond one of the limits of said predetermined operating zone.

7. In mechanism of the character described the combination with a temperature controlling mechanism of a member having a plunger movable thereby in response to changes of temperature, a pivoted lever actuated by said movable member, an arm pivotally supported from said lever and carrying an armature, a magnet, yielding means for causing said lever to remain in contact with said plunger, and means for causing said arm to remain in contact with the lever and to move therewith during normal operation of the device, and to permit movement relative thereto only when the device is subjected to predetermined abnormal conditions, said armature carrying a contact member engageable with a co-operable contact member to control an electrical circuit.

8. A circuit make and break device comprising a support, a lever having one end pivotally mounted on said support, an actuating member engaging said lever adjacent the pivotal support, an armature carried by said lever having a portion overlying said lever, a magnet mounted on said base and co-operating with said armature, a contact device actuated by the movement of said armature, and means connecting said armature to said lever adapted to hold said armature and said lever in fixed relation during normal operation of said actuating device and to permit said lever to move independently of said armature during abnormal operation of said actuating device.

9. A circuit make or break device comprising a support, a lever having one end pivotally mounted on said support, an actuating member engaging said lever adjacent the pivotal support, an armature carried by said lever having a portion overlying said lever, a magnet mounted on said base and co-operating with said armature, a contact device actuated by the movement of said armature, and means connecting said armature to said lever adapted to hold said armature and said lever in fixed relation during normal operation of said actuating device and to permit said lever to move independently of said armature during abnormal operation of said actuating device, said means being adapted to cause said lever and said armature to assume fixed operating relationship upon reestablishment of normal operating conditions.

10. A thermostatic control mechanism comprising a base, a lever pivotally carried by said base, a contact carrying arm mounted on said lever, a second contact element carried by said base and adapted to cooperate with said first contact member, and means yieldingly holding said contact arm in fixed relation with said lever during normal operation of said actuating device and adapted to permit independent movement of said lever and said contact carrying arm when said actuating device moves beyond its normal operating range.

11. A thermostatic electric circuit controlling device comprising a base, a contact carrying arm having a portion pivotally supported on said base, and a second portion carrying a contact, a thermally controlled actuator adapted to move the pivotal portion of said arm about said pivotal mounting, and releasing means permitting abnormal movement of the pivoted portion of said arm by said actuating device without correspondingly operating the contact carrying portion of said arm about the pivotal mounting, said releasing means being normally inoperative and adapted to become operative only when said actuator moves beyond the normal range of operation of said control device.

12. A thermostatic electric circuit control device comprising a base, a contact carrying arm, an actuating element, and means pivotally supported from the base interposed between the actuator and the contact carrying arm adapted to permit movement of said actuator beyond its normal operating range without correspondingly actuating said contact carrying arm, said means constituting a support for said arm.

13. A thermostatic electric circuit control device comprising a base, a contact carrying arm pivotally supported from the base, an actuating element, and means positioned between the actuator and the contact carrying arm adapted to permit movement of said actuator beyond its normal operating range without correspondingly actuating said contact carrying arm, and spring means yieldingly holding said means for permitting abnormal movements of said arm in contact with said arm and said actuator and also constituting means for yieldingly opposing movement of the contact carrying arm in response to movements of said actuator to thereby cause said arm to accurately follow all movements of said actuator within the normal range of operation of said device.

In testimony whereof, I hereunto affix my signature.

FRED W. GRUNDMAN.